March 7, 1933.   F. A. FAHRENWALD   1,899,948
CHAIN LINK AND INTEGRAL HEAD ARTICULATING PINTLES
Filed Jan. 16, 1931
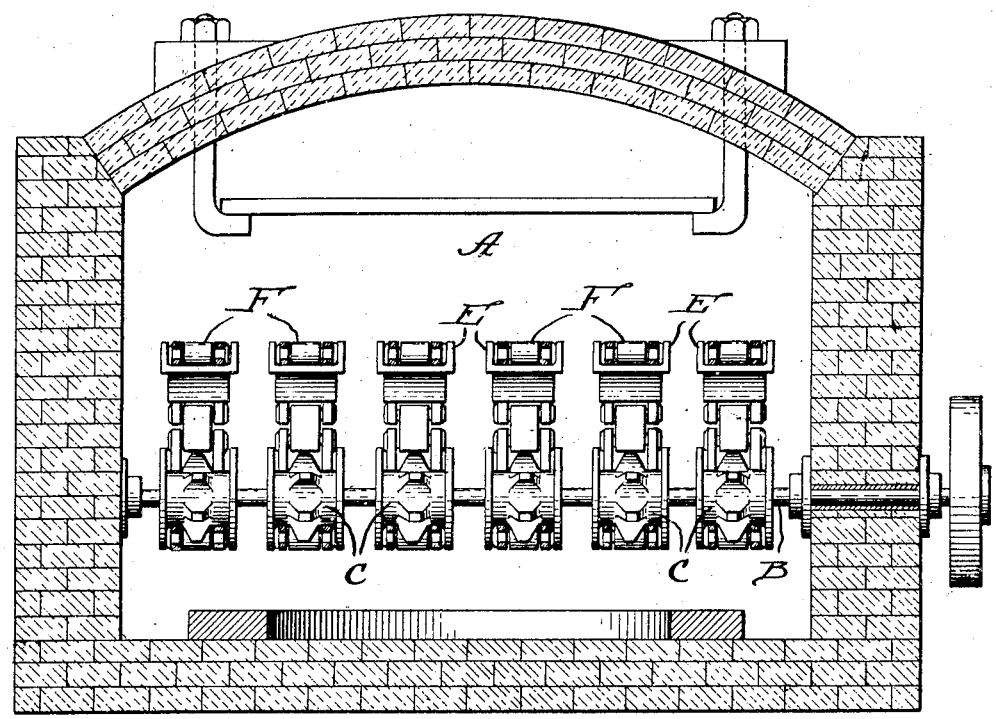
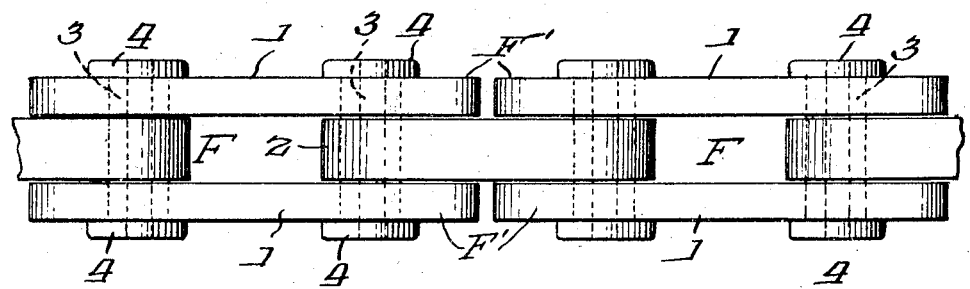
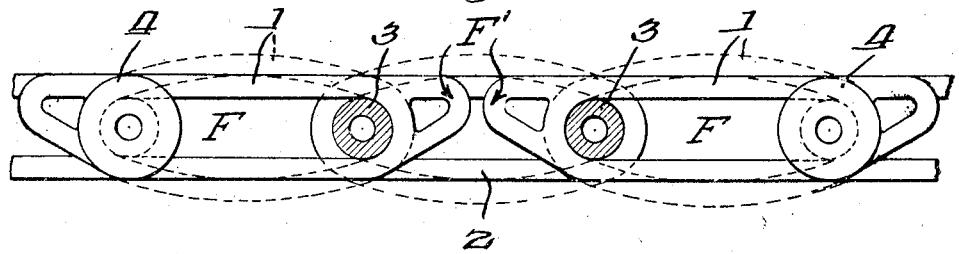

Patented Mar. 7, 1933

1,899,948

UNITED STATES PATENT OFFICE

FRANK A. FAHRENWALD, OF CHICAGO, ILLINOIS

CHAIN LINK AND INTEGRAL HEAD ARTICULATING PINTLE

Application filed January 16, 1931. Serial No. 509,097.

This invention is designed primarily for use in articulated structures that are submitted to high temperatures in use, for instance, endless conveyor chains moving slowly through heat treatment areas, in which situation constructions designed for high speed, low temperature and light load power transmission are inappropriate.

In most industrial furnace applications where a chain type of conveying belt is employed, the speed of travel is usually not more than one or two feet per minute, so that accuracy of pitch or fit in the articulation of the links is not so essential as is rugged strength and ability to resist severe wear conditions when the metal of the chain is at temperatures under which materials, such as heat resisting alloys, lose the major portion of their physical strength and become soft and easily scored under metal to metal contact. The use of bolts, rivets, cotter pins or like pintle-securing means in such situations is an especial source of trouble, and it is also undesirable to use, in high temperature environment, means locking the pintles on their bushings against rotation or to have the tension members of the endless chain arranged with the larger dimension of their section perpendicular to the axis of the pintle instead of parallel with and bearing directly upon the same, because of the extensive buffing and cutting caused by the narrow bearing when the metal of the conveyor is at high temperature.

The present invention avoids the disadvantages above enumerated by an arrangement of pintles which I term "full floating" pintles, characterized by having the pintles free to rotate in the links and present, progressively, new and different portions of their cylindrical surfaces in contacting position; also by having the greater sectional dimensions of the units which make up the conveyor bearing upon the surfaces of the pintles; also by having the heads, flanges or other enlargements on the ends of the pintles integral therewith, and resorting to structural expedients in the assembling of the pintles and links without the use of means locking the pintles against rotation, or separately inserted means providing the shoulders by which the pintles are confined against displacement. And the invention may be said to consist in combining with the unit links of a conveyor for heat treatment furnaces, so called "full floating" or freely rotatable pintles having end enlargements, assembling the pintles with the links without separation and displacement of their end enlargements but by spacing the bars of the link sufficiently to pass the heads between them and then pressing them together into normal pin-confining relation; and finally the application of trussing horns on the ends of the outside links beyond their pintle bearings which confine the flexing of the bars of the link, incident to assembly, to portions of the bars inside of the semi-circular pintle bearings, so that the latter are not put out of shape in the assembly. That is to say, these horns, consisting as they do of a pair of arms extending substantially tangential to the arcuate portion that forms the pintle bearing and being united at a point beyond the pintle bearing from the longitudinal portions of the link, are enabled to exert a counter-bending force when the sides are pressed together, and thereby prevent binding of the pintle bearing upon the pintle.

In the accompanying drawing—

Figure 1 represents a sectional view of a typical heat treating furnace equipped with endless carriers embodying the subject-matter of the present invention; certain of the links of the endless carriers being shown in transverse sections and others in end view.

Figure 2 is a plan view, on an enlarged scale, of a portion of an endless carrier of the kind shown in Figure 1.

Figure 3 is a side view of parts shown in Figure 2, two of the pintles being in transverse section in the plane of the near faces of the links.

Referring to Figures 1 to 3, A represents a heat treatment furnace chamber, mounted in which is a shaft B carrying chain driving sprockets C and guide troughs E of known construction. Running in the troughs E are linked conveyors F of a kind suitable for supporting and conveying metal articles requiring heat treatment.

As shown in Figures 2 and 3, the conveyor F is made up of outside links 1, inside links 2 and articulating pintles 3, the diameters of the body portions of which substantially fit the openings in the links and hold the latter in assembly against the tension of the drive. Pintles 3 are constructed with integral flanges 4 which constitute the enlargements that prevent axial displacement of the pintles in the links, these flanges being designed, in the embodiment selected for illustration, to bear against the side faces of the outer links. Inasmuch as the flanges 4 are in diameter greater than the normal distance between the bars which form the links and are integral with the pintles, the problem is presented of getting the ends of the pintles through the links; and this problem is solved by spreading the links in some such manner as that suggested by dotted lines in Figure 3, or originally forming the links in a shape such as shown, passing one end of the link through the wider portion of the resultant opening, and then restoring the link to normal condition by pressing its sides together in parallelism, or such other normal shape as may be desirable and appropriate to the service which they are to perform. By this method, as many links as may be desired can be strung on to a pintle or pintles of appropriate length, for instance, one inside link and two outside links, or any other desired number of oppositely extending links alternated or otherwise assembled in position, and in this way the chain can be built up and the two ultimate ends connected to close the chain.

Since it would be undesirable to distort the accurately formed semi-cylindrical surfaces of the link which receive the pintles, I have found it desirable to use upon at least some of the links, trussing horns F' which form virtual continuations of the longitudinal bars of the links beyond said bearing portions and thereby stiffen said portions against flexure at the time of bending the longitudinal portions of the links as an incident to assembly of the pintles. Incidentally, these trussing horns form link extensions which maintain the width of the conveyor at those portions of the length of the conveyor which are occupied by the inside links. Finally, these trussing link extensions also form, when the links are in alignment, abutments that prevent telescoping of the links longitudinally.

In each of the forms shown, the pintles are left entirely free to rotate under the flexing of the chain in rounding the sprockets or other guides; broad substantial bearing faces encounter the surfaces of the pintles in transmitting the drag of the chain, with consequent reduction of scuffing or roughing of the metal surfaces when at high temperatures; and the pintles are firmly interlocked against axial displacement without the use of removable securing means.

The present invention when embodied in its preferred form, contemplates links of relatively flat, approximately rectangular section, substantially uniform throughout and presenting an ideal design for casting from high temperature alloys free from flaws, and a design which may be produced very cheaply by cutting the links from alloy tubing and flattening them to the desired shape, or by turning them from solid or hollow bar stock, thus rendering available the more economical methods of production.

The present invention also contemplates, when embodied in its best form, inside and outside links constructed in the form of loops of relatively flat metal defining openings extending from end to end of the links; the loops having approximately semi-circular ends, the defining walls of which present flat inner faces through which the links bear against the cylindrical surfaces of the pintles; and the inside and outside links bearing against opposite semi-circles of said cylindrical surfaces and extending in opposite directions therefrom so that the pintles, while otherwise unconfined in the openings of the link, will be held to the ends of the link by the tension of the chain, and the intermediate walls of the link being deformable to admit of assembly of the integral shouldered pintles, in originally building up the chain, or disassembly and reassembly of pintles and links when replacement becomes necessary.

I claim:

1. In a chain conveyor for substantially the purpose described, link members and pintles articulating said link members; said pintles having integral end enlargements bearing laterally against links of the chain and preventing axial displacement of the pintles, certain of said links having trussing horns located beyond their bearings through which they receive the pintles.

2. A furnace chain comprising inside and outside links and articulating pintles; the pintles being constructed with enlarged ends comprising link confining shoulders; the links being constructed in the form of flat sectioned, curved ended loops with their openings extending from end to end of the links; the inside and outside links embracing, substantially, semi-circles of the cylindrical bodies of the pintles and extending in opposite directions therefrom; the pintles being otherwise free from confinement in the links; and certain of the links having aligned extensions beyond their portions which receive the pintles, whereby the links are prevented from telescoping longitudinally when slack.

3. A furnace chain, comprising inside and outside links and articulating pintles; the links being constructed in the form of loops with relatively flat defining walls; the pintles embracing, substantially, opposite semicircles of the cylindrical surfaces of the pintles and extending in opposite directions therefrom; portions of the links between their ends being deformable to permit assembly of the pintles and the defining walls of some of the links being extended beyond their portions which receive the pintles and united to form trusses that prevent flexure of their pintle-receiving portions in the assembly.

4. The method of producing chains from links and integrally headed pintles, which consists in providing links having curved end walls providing pintle bearings and longitudinal members defining link openings extending from said pintle bearings, and with said longitudinal members spaced apart to pass an integral head of a pintle between them, then assembling a desired number of links upon a pintle, and then pressing together said longitudinal members to prevent passage of a pintle head, and, while pressing said members together, preventing the binding of the pintle bearings upon the pintle by applying a counter-bending force to said curved end members from points remote therefrom.

5. As a new article of manufacture, a chain link constructed with an arcuate end portion providing a pintle bearing, and longitudinally extending side members defining an opening communicating with said pintle bearing; said longitudinally extending side members being spaced apart a distance sufficiently greater than the diameter of the pintle bearing to pass a pintle head through the link at a point remote from the pintle bearing; and said arcuate end portion being provided with arms extending approximately tangential thereto in the opposite direction to said longitudinal members and united to exert a counter-bending force at the pintle bearing when the longitudinal members are pressed together.

Signed at Chicago Heights, Illinois, this 5th day of January, 1931.

FRANK A. FAHRENWALD.